United States Patent

Yamamoto

[19]

[11] Patent Number: 5,874,678
[45] Date of Patent: Feb. 23, 1999

[54] WIRE BREAKING DETECTION EQUIPMENT FOR WIRE SAW

[75] Inventor: Seiji Yamamoto, Mitaka, Japan

[73] Assignee: Tokyo Seimitsu Co., Ltd., Tokyo, Japan

[21] Appl. No.: 883,491

[22] Filed: Jun. 26, 1997

[30] Foreign Application Priority Data

Jul. 23, 1996 [JP] Japan .................................. 8-193674

[51] Int. Cl.[6] ...................................................... B28D 1/08
[52] U.S. Cl. ........................... 73/661; 125/16.02; 125/21; 200/61.18
[58] Field of Search ............................ 73/572, 658, 661; 125/16.01, 16.02, 21; 83/72; 200/61.18

[56] References Cited

U.S. PATENT DOCUMENTS 3,841,297  10/1974  Mech ........................................ 125/21

*Primary Examiner*—John E. Chapman
*Attorney, Agent, or Firm*—Sixbey, Friedman, Leedom & Ferguson; David S. Safran

[57] ABSTRACT

A contact detecting bar is placed in a proximity to a wire wound on grooved rollers so that the broken wire can come into contact with the contact detecting bar. By detecting the contact between the broken wire and the contact detecting bar, the breaking of the wire can be detected. The vibration of the contact detecting bar is detected in order to detect the contact. When the amplitude of the vibration of the contact detecting bar exceeds a predetermined value, the contact of the broken wire is determined.

13 Claims, 10 Drawing Sheets

F I G. 1
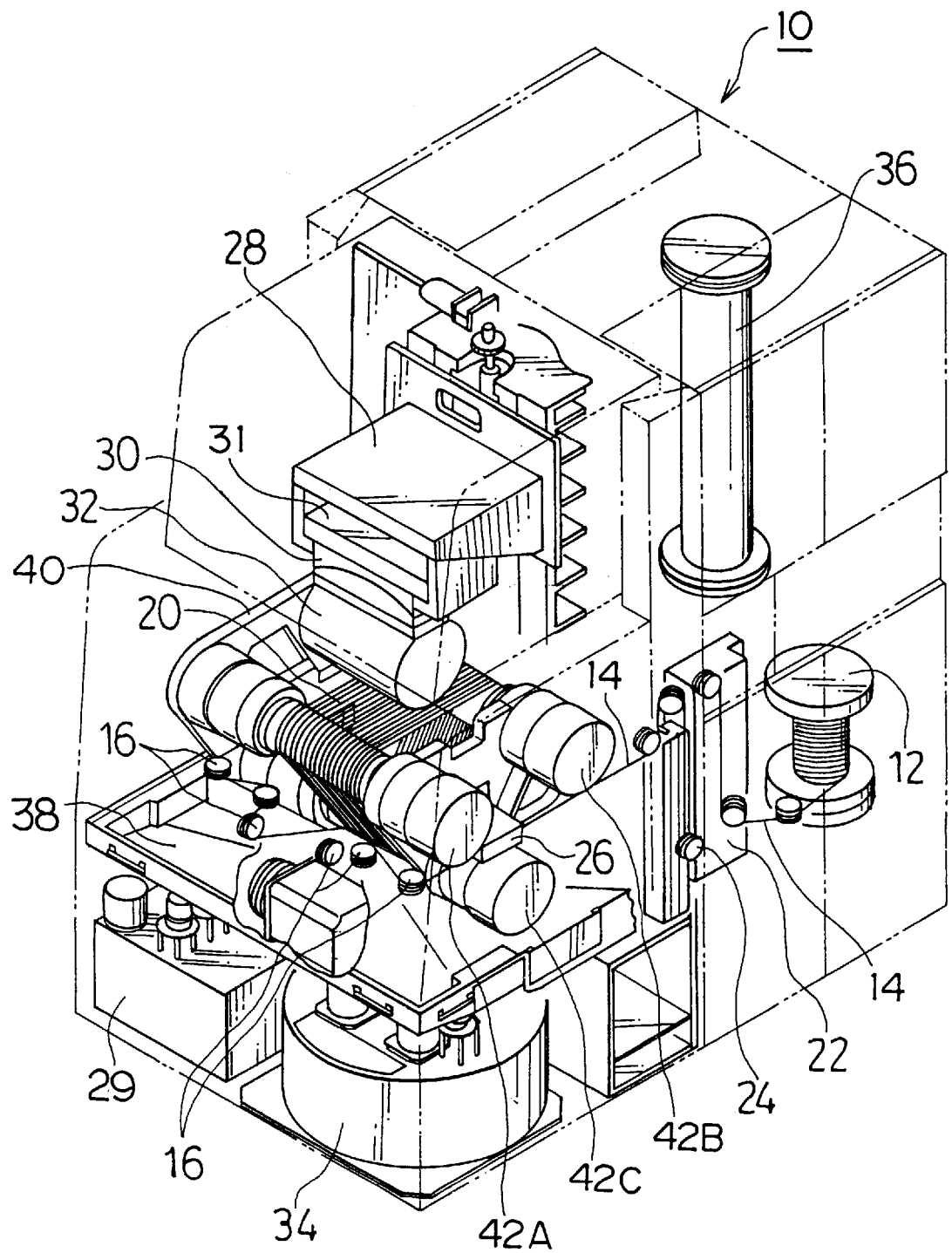

F I G. 6
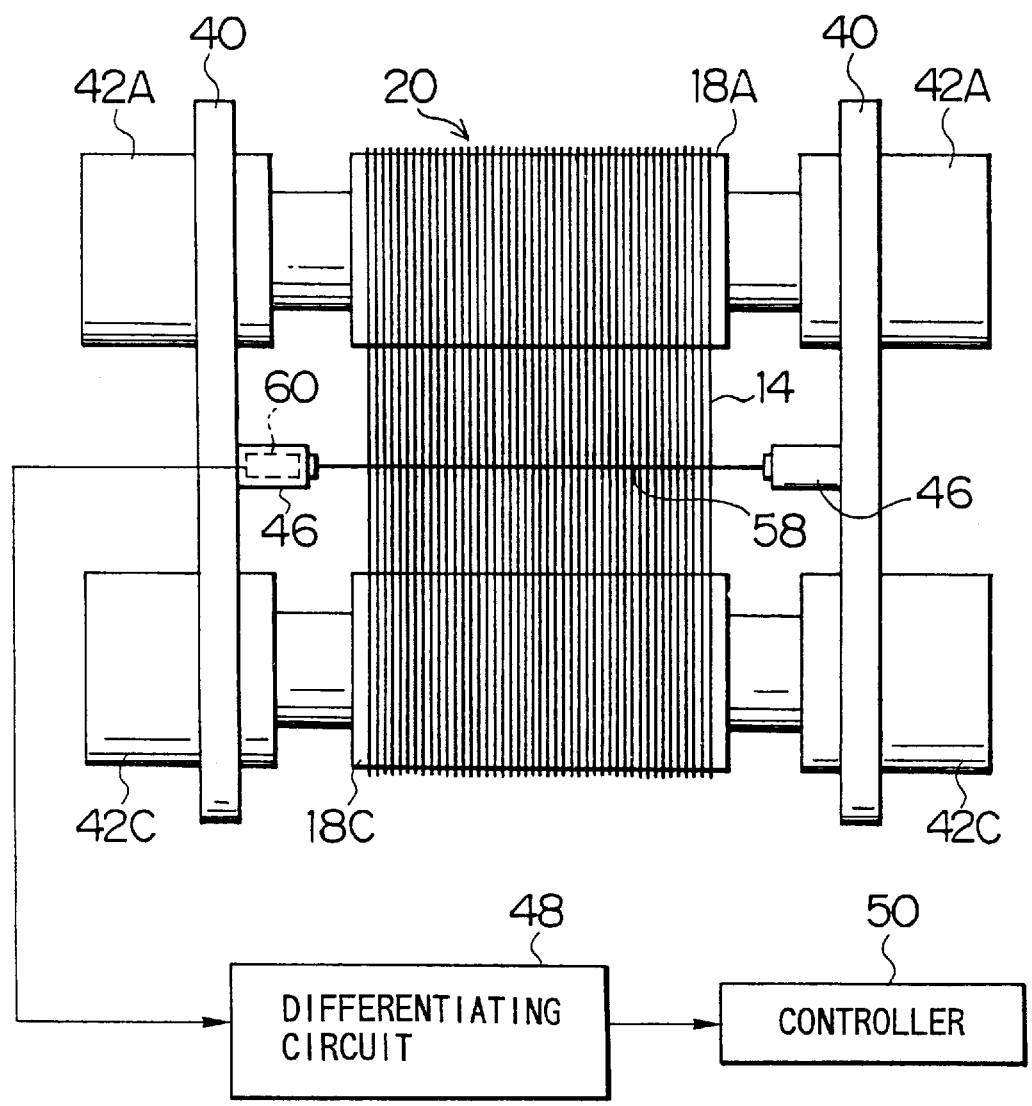

F I G. 7
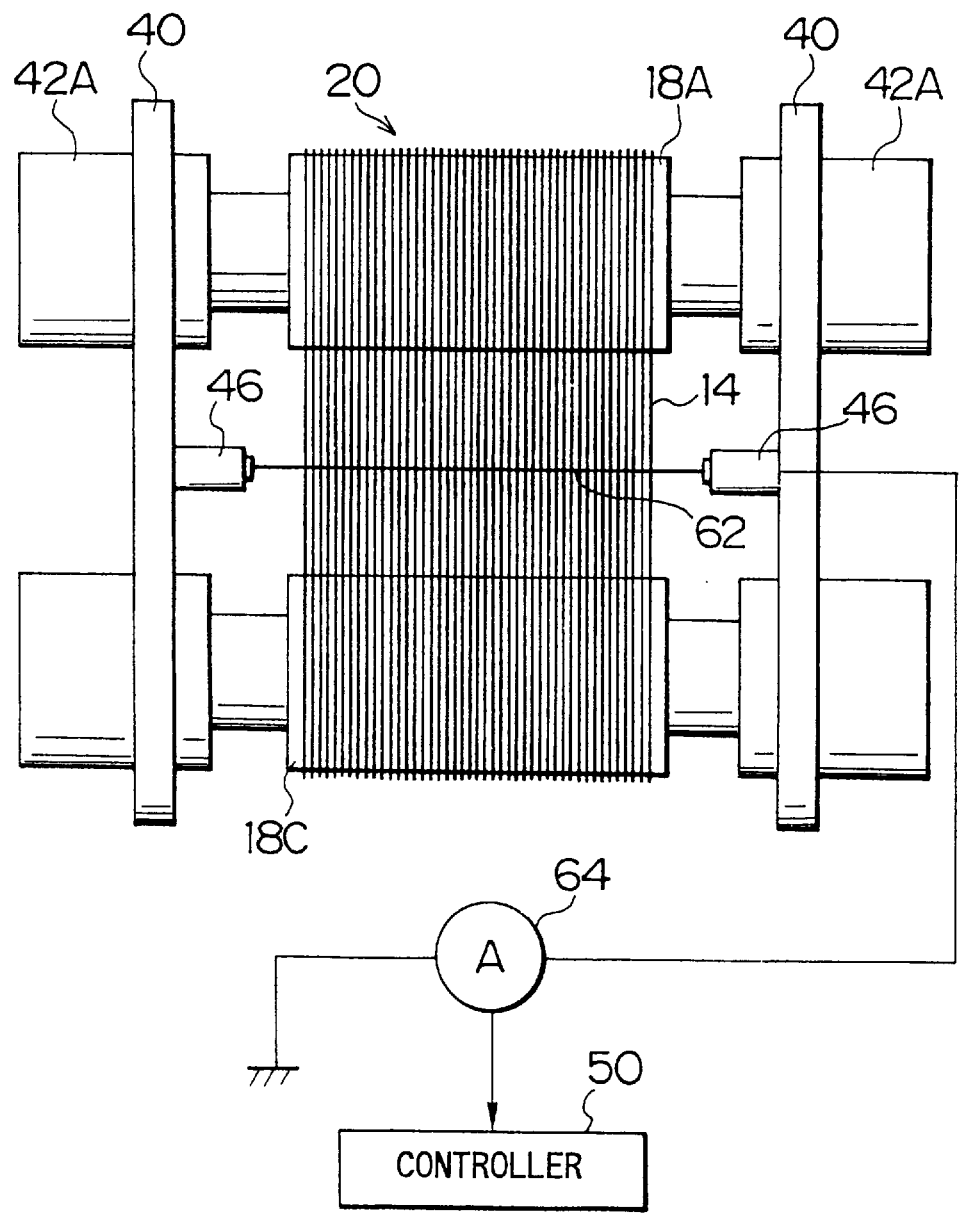

F I G. 8
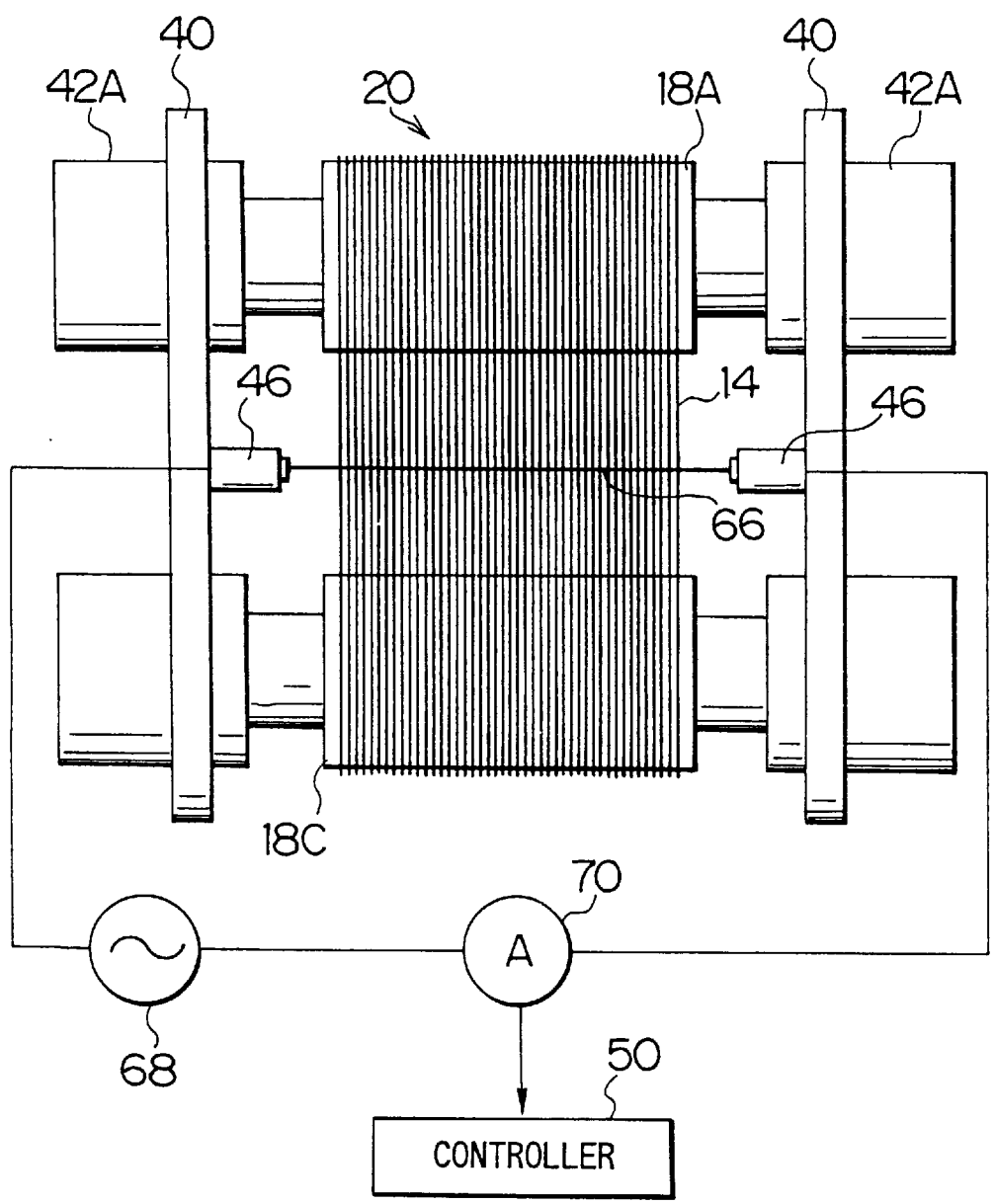

5,874,678

WIRE BREAKING DETECTION EQUIPMENT FOR WIRE SAW

BACKGROUND OF THE INVENTION

1. Field of the Invention

The present invention relates to wire breaking detection equipment for a wire saw, and more particularly to wire breaking detection equipment for the wire saw which slices brittle material such as silicon, glass and ceramics.

2. Description of the Related Art

In a well-known method of detecting the breaking of the wire in the wire saw, a predetermined voltage is applied to the moving wire, and when a fall in the voltage is detected, the breaking of the wire will be detected.

If, however, the above-stated method of electrically detecting the breaking of the wire is applied to the wire saw which slices a workpiece by means of slurry such as water-based slurry which has high conductivity, there are disadvantages because an error easily takes place and the breaking of the wire cannot be quickly detected.

SUMMARY OF THE INVENTION

Accordingly, it is an object of the present invention to provide wire breaking detection equipment for a wire saw, which is capable of detecting the breaking of the wire constantly in a wire saw which uses high-conductivity slurry such as water-based slurry, and which is capable of quickly detecting the breaking of the wire in a wire saw which uses low-conductivity slurry.

To achieve the above-mentioned object, the present invention is wire breaking detection equipment for a wire saw in which a wire moving between a pair of wire reels is wound on a plurality of grooved rollers so as to form a wire row, and a workpiece is pressed against the wire row which is being supplied with a cutting fluid so that the wire saw slices the workpiece into a number of wafers, the wire breaking detection equipment comprises: a contact detecting member provided in a proximity to a passage of the wire; a sensor for detecting that the broken wire has contacted the contact detecting member; and the wire breaking detection equipment is characterized in that the wire breaking detection equipment detects the contact between the broken wire and the contact detecting member by means of the sensor so as to detect the breaking of the wire.

According to the present invention, when the wire breaks, the broken wire contacts with the contact detecting member. By detecting the contact between the broken wire and the contact detecting member, the breaking of the wire can be determined.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a view illustrating the entire structure of a wire saw;

FIG. 6 is a view illustrating the construction of the third embodiment for the wire breaking detection equipment;

FIG. 7 is a view illustrating the construction of the fourth embodiment for the wire breaking detection equipment;

FIG. 8 is a view illustrating the construction of the fifth embodiment for the wire breaking detection equipment;

DETAILED DESCRIPTION OF THE PREFERRED EMBODIMENTS

Figure 2:
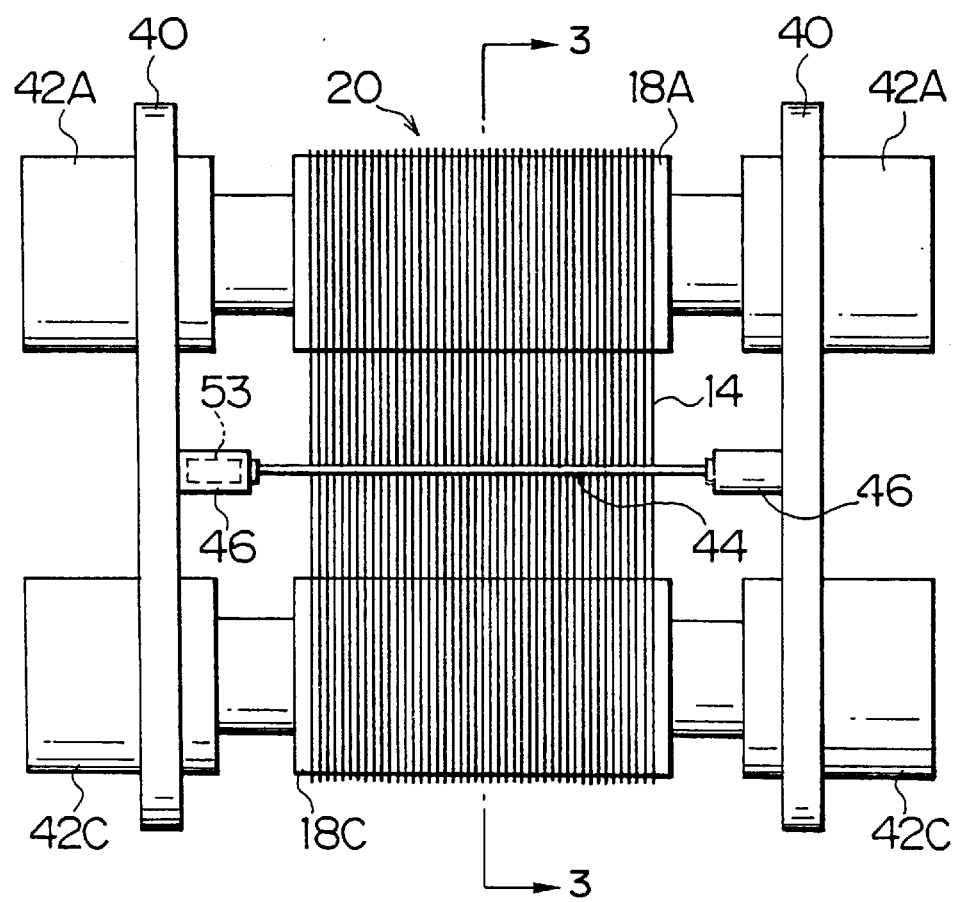
FIG. 2 is an enlarged front view illustrating a cutting part of the wire saw.

This invention will be described in further detail by way of example with reference to the accompanying drawings.

FIG. 1 is a perspective view of an embodiment for a wire saw 10 which the wire breaking detection equipment of the present invention applies to.

As shown in FIG. 1, a wire 14 on a wire reel 12 is wound on three grooved rollers 18A, 18B, 18C via a wire passage which is formed by a number of guide rollers 16, 16, . . . , so that a horizontal wire row 20 can be formed. The wire 14 forming the wire row 20 is taken up by a wire reel (not shown) via the other wire passage which is symmetrical to the abovementioned wire passage across the wire row 20.

Wire guiding equipment 22, a dancer roller 24 and wire cleaning equipment 26 are provided on the wire passages which are formed at both sides of the wire row 20 (only one side is illustrated). The wire guiding equipment 22 guides the wire 14 from the wire reel 12 at a constant pitch. A weight of a predetermined weight (not shown) is provided at the dancer roller 24, and the wire 14 moves under a proper tensile force held with the weight. The wire cleaning equipment 26 jets a cleaning fluid, which is supplied from a cleaning fluid tank 29, to the wire 14, and slurry which has adhered to the wire 14 is removed from the wire 14.

A motor (not shown), which is rotatable forward and backward, connects to the pair of the wire reels 12 and the grooved roller 18C. When the motor is driven, the wire 14 moves back and forth at a high speed between the pair of the wire reels 12.

A workpiece feed table 28 is placed above the wire row 20, and the workpiece feed table 28 moves up and down vertically to the wire row 20. A tilting unit 30 is provided at the workpiece feed table 28 via a setting base 31. An ingot 32 is supported by the bottom of the tilting unit 30, and the ingot 32 is placed at a desired angle of inclination.

In the wire saw 10 which is constructed in the above-mentioned manner, the workpiece feed table 28 is moved down toward the wire row 20, and the ingot 32 is pressed against the wire row 20 moving at a high speed, so that the ingot 32 can be sliced into wafers. In this case, the slurry is supplied from a slurry tank 34 to the wire row 20 through a nozzle (not shown), and the ingot 32 is sliced into wafers by lapping operation of abrasive grains in the slurry.

The slurry used for machining the ingot 32 is collected into the slurry tank 34 via an oil pan 38 which is placed below the wire row 20, and the slurry is circulated for use while a deficiency is supplied. In this case, the slurry absorbs the heat generated during the machining and the temperature of the slurry increases. For this reason, the collected slurry is cooled to a predetermined temperature by a heat exchanger 36.

Figure 3:
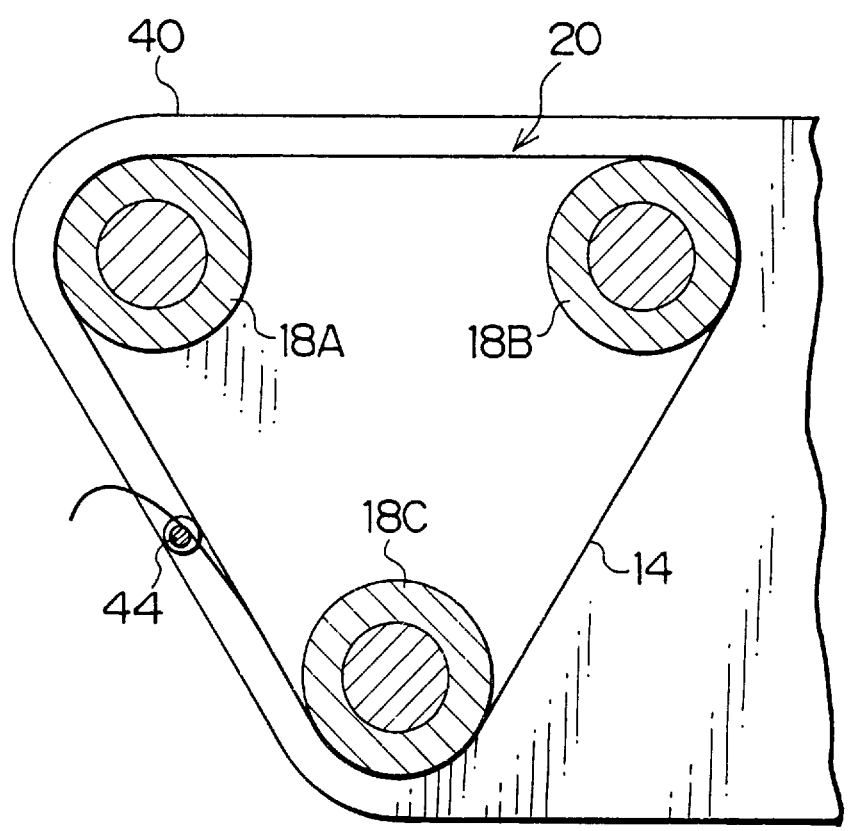
FIG. 3 is a sectional view taken on line A—A of FIG. 2.

FIG. 2 is an enlarged front view of the cutting part of the wire saw, and FIG. 3 is a sectional view taken on line A—A of FIG. 2.

As illustrated in FIGS. 2 and 3, the three grooved rollers 18A, 18B, 18C are rotatably supported by a pair of supporting plates 40, 40, which are fixed on a main body frame (not shown) of the wire saw 10, via bearings 42A, 42A, 42B, 42B, 42C, 42C. A number of grooves are formed at regular intervals on the outer periphery of the grooved rollers 18A, 18B, 18C, and the wire 14 is successively wound on these grooved rollers 18A, 18B, 18C to form the wire row 20.

A contact detecting bar 44 is placed substantially halfway between the grooved rollers 18A and 18C, and the contact detecting bar 44 detects the contact of the wire 14. Both ends of the contact detecting bar 44 are supported on a pair of brackets 46, 46, which are secured to the pair of the supporting plates 40, 40. When the wire 14 wound on the grooved rollers 18A, 18B, 18C breaks, the broken wire 14 contacts with the contact detecting bar 44.

Figure 4:
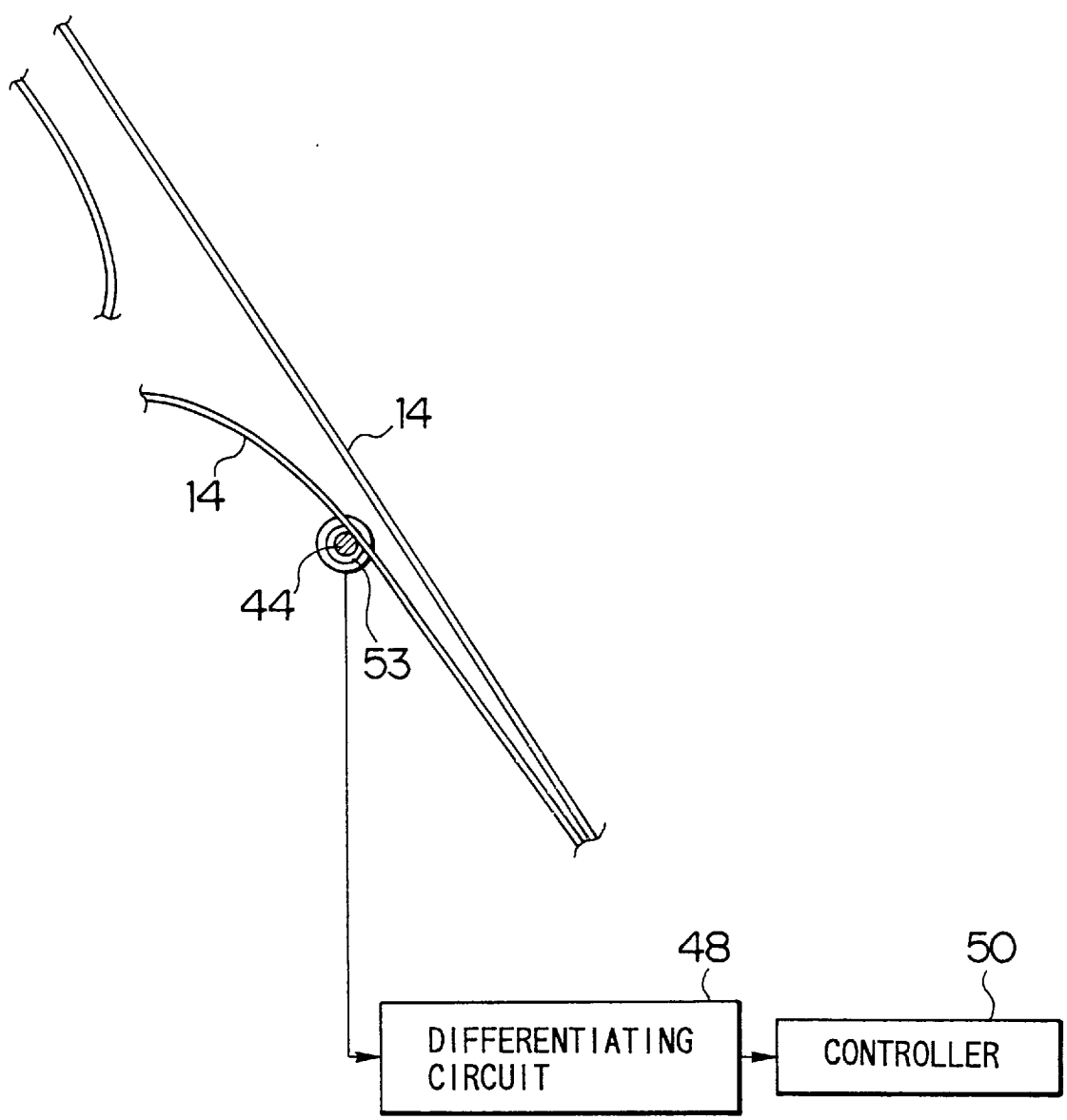
FIG. 4 is a view of assistance in explaining the situation where a wire has broken.

A vibration sensor 53 is built in one of the brackets 46, 46, and the vibration sensor 53 detects the vibration of the contact detecting bar 44. The vibration sensor 53 detects the vibration of the contact detecting bar 44, and a detected signal is output to a controller 50 via a differentiating circuit 48 as shown in FIG. 4.

When the controller 50 detects the vibration of the contact detecting bar 44 which amplitude is greater than a predetermined value, it determines that the wire 14 has broken, and stops operating the wire saw 10. That is, when the wire 14 breaks, the broken wire 14 hits against the contact detecting bar 44, and the contact detecting bar 44 vibrates greatly due to an impact caused by the hit. The controller 50 determines that the wire 14 has broken by detecting the vibration of the contact detecting bar 44 which is hit by the broken wire 14.

When the grooved rollers 18A, 18B, 18C are rotated, or the slurry supplied to the wire row 20 hits the contact detecting bar 44, the contact detecting bar 44 vibrates slightly. The vibration sensor 53 detects the slight vibration of the contact detecting bar 44; however, the detected signal is removed as a noise component in the differentiating circuit 48. Thereby, the controller 50 is capable of detecting only impulsive vibration of the contact detecting bar 44 which occurs when the broken wire 14 hits against the contact detecting bar 44. Thus, the incorrect detection of the breaking of the wire 14 can be prevented.

An explanation will hereunder be given about the operation of the embodiment for the wire breaking detection equipment for the wire saw according to the present invention.

The vibration sensor 53 regularly detects the vibration of the contact detection bar 44, and the detected signal is regularly output to the controller 50 via the differentiating circuit 48. The controller 50 detects the breaking of the wire 14 by detecting the vibration of the contact detecting bar 44 which amplitude is greater than a predetermined value.

That is, as shown in FIG. 4, when the wire 14 on the grooved rollers 18A, 18B, 18C breaks, the broken wire 14 hits against the contact detecting bar 44. Then, the broken wire 14 vibrates the contact detecting bar 44, and the vibration of the contact detecting bar 44 is greater than the normally-detected vibration of the contact detecting bar 44. Thus, when the controller 50 detects the vibration of the contact detecting bar 44 which amplitude is greater than a predetermined value, it can determine that the wire 14 has broken and the broken wire 14 has contacted with the contact detecting bar 44. Thereby, it is determined that the wire 14 has broken. Then, the controller 50 stops operating the wire saw 10 on detection of the breaking of the wire 14.

As stated above, according to the wire breaking detection equipment for the wire saw of the present invention, the contact of the broken wire 14 is detected in order to determine that the wire 14 has broken. Thus, even in the case of the wire saw which slices the ingot by means of the water-based slurry, the error can be prevented unlike the conventional electrically detecting method, and the breaking of the wire 14 can be instantaneously detected without fail.

In this embodiment, both ends of the contact detecting bar 44 are supported; however, only one end of the bar 44 may be supported.

Next, an explanation will be given about the second embodiment for the wire breaking detection equipment for the wire saw according to the present invention. Parts similar to those in the first embodiment are denoted by the same reference numerals, and they will not be described.

In the first embodiment, the breaking of the wire 14 on the grooved rollers 18A, 18B, 18C is detected. On the other hand, in the second embodiment, the breaking of the wire 14 moving on the wire passage formed by the guide rollers 16, 16, . . . is detected.

Figure 5:
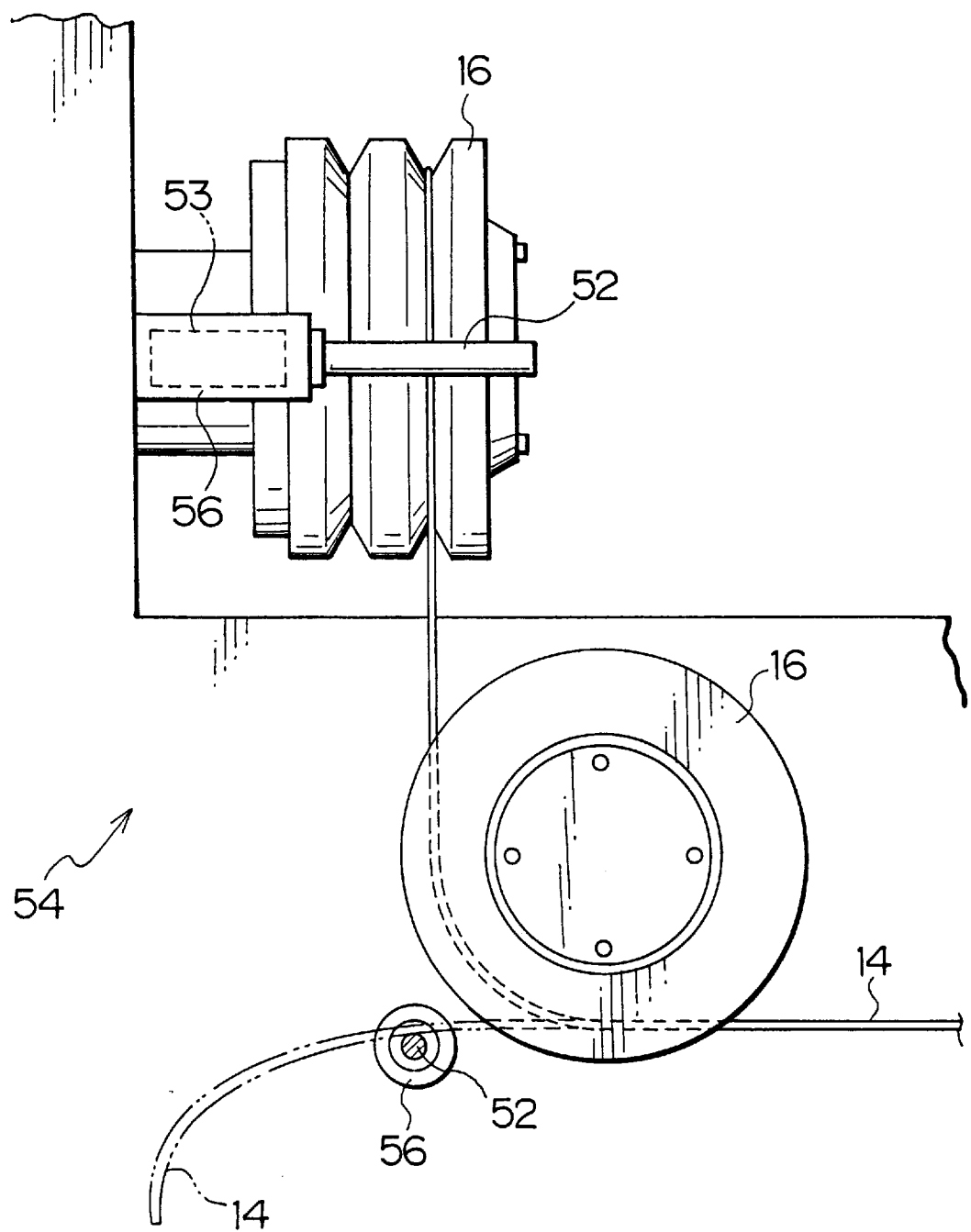
FIG. 5 is a view illustrating the construction of the second embodiment for the wire breaking detection equipment.

As shown in FIG. 5, contact detecting bars 52 are provided in a proximity to the guide rollers 16, 16 on the wire passage, in a direction perpendicular to the moving wire 14. One end of the contact detecting bar 52 is supported by a bracket 56 which is secured to a main body frame 54 of the wire saw 10. The vibration sensor 53 is built in the bracket 56, and the vibration sensor 53 detects the vibration of the contact detecting bar 52. The detected signal of the vibration is output to the controller via the differentiating circuit as is the case in the first embodiment.

An explanation will hereunder be given about the operation of the second embodiment for the wire breaking detection equipment for the wire saw according to the present invention.

As illustrated in FIG. 5, when the wire 14 moving on the wire passage breaks, the broken wire 14, which is represented by an alternate long and two short dashes line, hits and vibrates the contact detecting bar 52. In this case, the vibration of the contact detecting bar 52 is greater than the normally-detected vibration of the contact detecting bar 52 (e.g. the vibration of the wire saw itself). Thus, when the controller 50 detects the vibration of the contact detecting bar 52 which amplitude is greater than a predetermined value, the controller 50 can determine that the wire 14 has broken and the broken wire 14 has contacted the contact detecting bar 52. Then, the controller 50 stops the wire saw 10 upon detection of the breaking of the wire 14.

According to the wire breaking detection equipment for the wire saw for the second embodiment, the contact of the broken wire 14 is detected so as to determine that the wire 14 has broken. Thereby, the breaking of the wire 14 can be instantaneously detected without fail.

Next, an explanation will be given about the third embodiment for the wire breaking detection equipment for the wire saw according to the present invention. Parts similar to those in the first embodiment are denoted by the same reference numerals, and they will not be described.

In the first embodiment, as shown in FIG. 2, the contact detecting bar 44 is supported by the pair of the brackets 46, 46 provided on the supporting plates 40, 40. On the other hand, in the third embodiment, as shown in FIG. 6, a contact detecting wire 58 is stretched between the brackets 46, 46.

A load sensor 60 is built in one of the brackets 46, 46, and the load sensor 60 detects the variations in a tensile force of the contact detecting wire 58. One end of the contact detecting wire 58 is connected with the load sensor 60. The variations in the tensile force of the contact detecting wire 58, which is detected by the load sensor 60, are output to the controller 50 via the differentiating circuit 48.

When the controller 50 detects the variation of more than a predetermined value in the tensile force of the contact detecting wire 58, the controller 50 determines that the wire 14 has broken and stops operating the wire saw 10. That is, when the wire 14 breaks, the broken wire 14 hits against the contact detecting wire 58, and the tensile force of the contact detecting wire 58 changes greatly due to an impact caused by the hit. The controller 50 detects the variations in the tensile force of the contact detecting wire 58 when the broken wire 14 hits against the contact detecting wire 58, and it can be determined that the wire 14 has broken.

An explanation will hereunder be given about the operation of the third embodiment for the wire breaking detection equipment for the wire saw according to the present invention.

The load sensor 60 regularly detects the tensile force of the contact detecting wire 58, and the detected signal is regularly output to the controller 50 via the differentiating circuit 48. The controller 50 detects the change of more than a predetermined value in the tensile force of the contact detecting wire 58 to thereby detect the breaking of the wire 14.

That is, when the wire 14 on the grooved rollers 18A, 18B, 18C breaks, the broken wire 14 hits against the contact detecting wire 58. When the broken wire 14 contacts the contact detecting wire 58, the tensile force of the contact detecting wire 58 changes. In this case, the variation in the tensile force of the contact detecting wire 58 is much larger than the normally-detected variation in the tensile force of the contact detecting wire 58. Thus, when the controller 50 detects the change of more than a predetermined value in the tensile force of the contact detecting wire 58, it may determine that the wire 14 has broken and the broken wire 14 has contacted the contact detecting wire 58.

As stated above, according to the wire breaking detection equipment for the wire saw for the third embodiment, the breaking of the wire 14 can be instantaneously detected without fail as is the case in the first embodiment.

Next, an explanation will be given about the fourth embodiment for the wire breaking detection equipment for the wire saw according to the present invention. Parts similar to those in the first and third embodiments are denoted by the same reference numerals, and they will not be described.

As shown in FIG. 7, a contact detecting wire 62 is stretched between the brackets 46, 46. The contact detecting wire 62 is insulated from the main body of the wire saw 10 by the pair of the brackets 46, 46.

On the other hand, a predetermined voltage is applied to the wire 14 moving back and forth between the pair of the wire reels 12.

Thus, when the wire 14 which the voltage is applied to breaks and contacts the contact detecting wire 62, electric current momentarily passes through the insulated contact detecting wire 62. The electric current momentarily passing though the contact detecting wire 62 is detected so as to determine that the wire 14 has broken.

An ammeter 64 connects to the contact detecting wire 62, and the ammeter 64 detects the electric current passing through the contact detecting wire 62. The detected signal of the ammeter 64 is output to the controller 50. When the controller 50 detects that the electric current passes through the contact detecting wire 62, it determines that the wire 14 has broken and stops operating the wire saw 10.

An explanation will hereunder be given about the operation of the forth embodiment for the wire breaking detection equipment for the wire saw according to the present invention.

The electric current of the contact detecting wire 62 is regularly monitored by the controller 50. The controller 50 detects the electric current which passes through the contact detecting wire 62 to thereby detect the breaking of the wire 14.

That is, when the wire 14 in motion breaks, the broken wire 14 contacts the contact detecting wire 62. Since a predetermined voltage is applied to the broken wire 14, electric current momentarily passes through the contact detecting wire 62 at the time of contact.

Thus, the controller 50 detects the electric current passing through the contact detecting wire 62 to thereby determine that the wire 14 has broken.

According to the wire breaking detection equipment for the wire saw for the fourth embodiment, the breaking of the wire 14 can be instantaneously detected without fail as is the case in the first, second and third embodiments.

Next, an explanation will be given about the fifth embodiment of the wire breaking detection equipment for the wire saw according to the present invention. Parts similar to those in the first, third and fourth embodiments are denoted by the same reference numerals, and they will not be explained.

As shown in FIG. 8, a contact detecting wire 66 is stretched between the brackets 46, 46. When the moving wire 14 is breaks and hits against the contact detecting wire 66, the contact detecting wire 66 breaks on an impact caused by the hit.

On the other hand, a predetermined voltage is applied to the contact detecting wire 66 by a power source 68, and electric current of a predetermined amount passes through the contact detecting wire 66.

When the broken wire 14 hits against the contact detecting wire 66 and the contact detecting wire 66 breaks, the electric current passing through the contact detecting wire 66 becomes zero. By detecting that the electric current passing through the contact detecting wire 66 is zero, it can be determined that the wire 14 breaks.

For this reason, an ammeter 70 connects to the contact detecting wire 66, and the ammeter 70 detects the electric current passing through the contact detecting wire 66. The detected signal of the ammeter 70 is regularly output to the controller 50. When the controller 50 detects that the electric current passing through the contact detecting wire 66 becomes zero, it determines that the wire 14 has broken and stops operating the wire saw 10.

An explanation will hereunder be given about the operation of the fifth embodiment for the wire breaking detection equipment for the wire saw according to the present invention.

The ammeter 70 regularly detects the electric current passing through the contact detecting wire 66, and the detected signal is regularly output to the controller 50. By detecting when the electric current passing through the contact detecting wire 58 becomes zero, the controller 50 detects that the wire 14 has broken.

That is, when the moving wire 14 breaks, the broken wire 14 hits against the contact detecting wire 66. When the broken wire 14 contacts the contact detecting wire 66, the contact detecting wire 66 breaks due to the shock resulting from the hit.

On the other hand, a predetermined voltage is applied to the contact detecting wire 66, and electric current of a predetermined amount passes through the contact detecting wire 66. When the contact detecting wire 66 breaks, the electric current passing through the contact detecting wire 66 becomes zero.

By detecting that the electric current passing through the contact detecting wire 66 becomes zero, the controller 50 can determine that the wire 14 has broken.

As stated above, according to the wire breaking detection equipment for the wire saw for the fifth embodiment, the breaking of the wire 14 can be instantaneously detected without fail as is the case in the first, second, third, and fourth embodiments.

Figure 9:
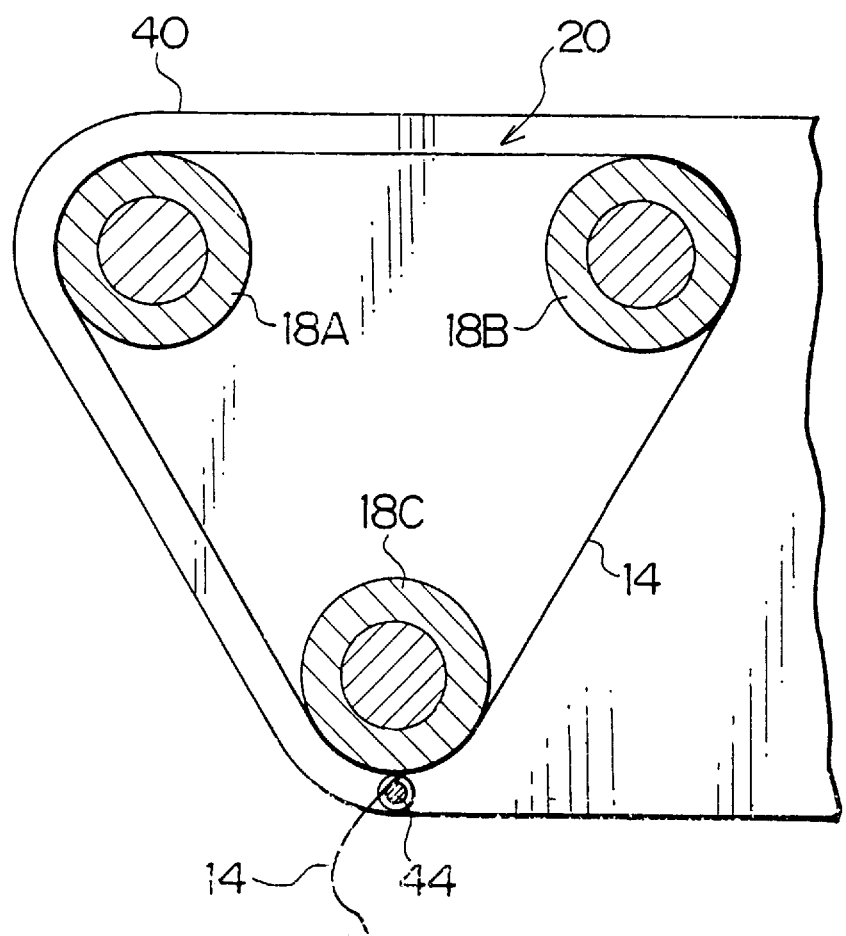
FIG. 9 is a view illustrating the construction of another embodiment.
Figure 10:
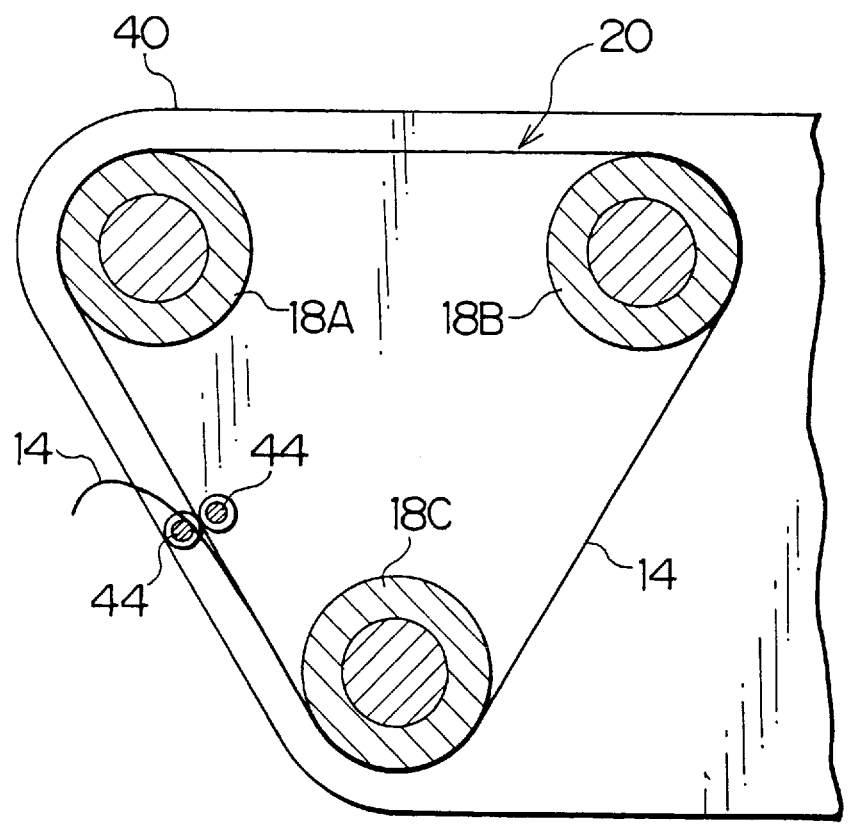
FIG. 10 is a view illustrating the construction of another embodiment.

In the first, third, fourth and fifth embodiments stated previously, the contact detecting member (the contact detecting bar 44 and the contact detecting wires 58, 62, 66) is positioned halfway between the grooved rollers 18A and 18C. The contact detecting member may be provided at any position where the contact detecting member does not interfere with the slicing and the broken wire 14 contacts with the contact detecting member without fail. For example, the contact detecting member may be positioned halfway between the grooved rollers 18B and 18C, or below the grooved roller 18C as shown in FIG. 9. Moreover, as shown in FIG. 10, two contact detecting members may be provided in such a manner as to face each other across the wire 14.

As set fourth hereinabove, according to the present invention, by detecting that the broken wire contacts with the contact detecting member, it can be determined that the wire has broken. Thereby, the breaking of the wire can be quickly detected without fail.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. Wire breaking detection equipment for a wire saw in which a wire moving between a pair of wire reels is wound on a plurality of grooved rollers so as to form a wire row, and a workpiece is pressed against said wire row which is being supplied with a cutting fluid so that said wire saw slices said workpiece into a number of wafers, said wire breaking detection equipment comprising:

a contact detecting member provided in a proximity to a passage of said wire;

a sensor for detecting that the broken wire has contacted said contact detecting member; and wherein said wire breaking detection equipment detects the contact between the broken wire and said contact detecting member by means of said sensor so as to detect the breaking of said wire.

2. The wire breaking detection equipment as defined in claim 1, wherein said sensor detects amplitude of vibration of said contact detecting member, and said wire breaking detection equipment detects variations in the amplitude of the vibration of said contact detecting member by means of said sensor so as to detect the contact between the broken wire and said contact detecting member.

3. The wire breaking detection equipment as defined in claim 2, further comprising a differentiating circuit for removing noise components from output signals of said sensor.

4. The wire breaking detection equipment as defined in claim 1, wherein said contact detecting member is a stretched contact detecting wire, said sensor detects variations of tensile force of said contact detecting wire, and said wire breaking detection equipment detects the variations in the tensile force of said contact detecting wire by means of said sensor so as to detect the contact between the broken wire and said contact detecting wire.

5. The wire breaking detection equipment as defined in claim 4, further comprising a differentiating circuit for removing noise components from output signals of said sensor.

6. The wire breaking detection equipment for the wire saw as defined in claim 1, wherein said contact detecting member is provided in a proximity to said wire row formed on said grooved rollers, said contact detection equipment detecting the breaking of said wire forming said wire row.

7. The wire breaking detection equipment for the wire saw as defined in claim 1, wherein a pair of said contact detecting members are provided in such a manner as to face each other across said moving wire.

8. Wire breaking detection equipment for a wire saw in which a wire moving between a pair of wire reels is wound on a plurality of grooved rollers so as to form a wire row, and a workpiece is pressed against said wire row which is being supplied with a cutting fluid so that said wire saw slices said workpiece into a number of wafers, said wire breaking detection equipment comprising:

a power source for applying a predetermined voltage to said wire moving back and forth between said pair of wire reels;

an insulated contact detecting member provided in a proximity to a passage of said wire;

a sensor for detecting electric current on said contact detecting member; and wherein said wire breaking detection equipment detects, by means of said sensor, the electric current on said contact detecting member caused by the contact between the broken wire and said contact detecting member so as to detect the breaking of said wire.

9. The wire breaking detection equipment for the wire saw as defined in claim 8, wherein said contact detecting member is provided in a proximity to said wire row formed on said grooved rollers, said contact detection equipment detecting the breaking of said wire forming said wire row.

10. The wire breaking detection equipment for the wire saw as defined in claim 8, wherein a pair of said contact detecting members are provided in such a manner as to face each other across said moving wire.

11. Wire breaking detection equipment for a wire saw in which a moving-wire moving between a pair of wire reels is wound on a plurality of grooved rollers so as to form a wire row, and a workpiece is pressed against said wire row which is being supplied with a cutting fluid so that said wire saw slices said workpiece into a number of wafers, said wire breaking detection equipment comprising:

a contact detecting wire provided in a proximity to a passage of said moving-wire, said contact detecting wire breaking when the broken moving-wire hits against said contact detecting wire;

a power source for applying a predetermined voltage to said contact detecting wire;

a sensor for detecting electric current on said contact detecting wire; and wherein said wire breaking detection equipment detects, by means of said sensor, that the electric current on said contact detecting wire becomes zero caused by the contact between the broken moving-wire and said contact detecting wire so as to detect the breaking of said moving-wire.

12. The wire breaking detection equipment for the wire saw as defined in claim 11, wherein said contact detecting wire is provided in a proximity to said wire row formed on said grooved rollers, said contact detection equipment detecting the breaking of said moving-wire forming said wire row.

13. The wire breaking detection equipment for the wire saw as defined in claim 11, wherein a pair of said contact detecting wires are provided in such a manner as to face each other across said moving-wire.

* * * * *